US 10,775,494 B2

(12) United States Patent
Schiffmann et al.

(10) Patent No.: US 10,775,494 B2
(45) Date of Patent: Sep. 15, 2020

(54) METHOD AND SYSTEM FOR DETERMINING THE POINTING ANGLE OF A MOVING OBJECT

(71) Applicant: APTIV TECHNOLOGIES LIMITED, St. Michigan (BB)

(72) Inventors: Jan K. Schiffmann, Newbury Park, CA (US); Wenbing Dang, North Hollywood, CA (US); Kumar Vishwajeet, Pasadena, CA (US); Keerthi Raj Nagaraja, San Francisco, CA (US); Franz P. Schiffmann, Port Hueneme, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 355 days.

(21) Appl. No.: 15/914,219

(22) Filed: Mar. 7, 2018

(65) Prior Publication Data
US 2019/0277960 A1    Sep. 12, 2019

(51) Int. Cl.
*G01S 13/93*    (2020.01)
*G01S 13/72*    (2006.01)
*G01S 13/931*   (2020.01)
*G01S 13/58*    (2006.01)
*G01S 15/931*   (2020.01)
(Continued)

(52) U.S. Cl.
CPC .......... *G01S 13/723* (2013.01); *G01S 13/589* (2013.01); *G01S 13/931* (2013.01); *G01S 15/66* (2013.01); *G01S 15/931* (2013.01); *G01S 17/66* (2013.01); *G01S 17/931* (2020.01); *G01S 2013/9321* (2013.01); *G01S 2013/9323* (2020.01);
(Continued)

(58) Field of Classification Search
None
See application file for complete search history.

(56) References Cited

U.S. PATENT DOCUMENTS 6,002,983 A  * 12/1999 Alland .................. G01S 13/66
                                              701/301
6,420,996 B1 *  7/2002 Stopczynski ......... G01S 13/765
                                              342/70
(Continued)

FOREIGN PATENT DOCUMENTS

DE    102013018310 A1    4/2015
EP       3151034 A1      4/2017
EP       3285230 A1      2/2018

OTHER PUBLICATIONS

European Search Report for Application No. 19158588.4, European Patent Office, dated Jul. 2, 2019.

*Primary Examiner* — Jonathan M Dager
(74) *Attorney, Agent, or Firm* — Carlson, Gaskey & Olds

(57) ABSTRACT

An illustrative example method of tracking a moving object includes determining a heading angle of a centroid of the object from a tracking sensor, determining a raw difference value corresponding to a difference between a pointing angle of a selected feature on the object and the heading angle, wherein the raw difference is based on a trajectory curvature of the centroid from the tracking sensor and a distance between the centroid and the selected feature, determining a filtered difference between the pointing angle and the heading angle using a low pass filter, and determining the pointing angle by subtracting the filtered difference from the heading angle.

16 Claims, 3 Drawing Sheets

(51) Int. Cl.
  *G01S 17/66*  (2006.01)
  *G01S 15/66*  (2006.01)
  *G01S 17/931*  (2020.01)

(52) U.S. Cl.
  CPC ............... *G01S 2013/9324* (2020.01); *G01S 2013/93271* (2020.01)

(56) References Cited

U.S. PATENT DOCUMENTS

| | | | |
|---|---|---|---|
| 8,224,525 B1* | 7/2012 | Rapoport | A01B 69/007 180/204 |
| 2008/0174454 A1* | 7/2008 | Bitar | G01C 23/00 340/975 |
| 2009/0157314 A1* | 6/2009 | Jordan | G01S 13/931 701/300 |
| 2016/0125739 A1* | 5/2016 | Stewart | G01C 21/203 701/21 |
| 2017/0199274 A1* | 7/2017 | Sasabuchi | G06K 9/00805 |
| 2017/0236422 A1* | 8/2017 | Naka | B60W 30/12 701/301 |
| 2019/0277639 A1* | 9/2019 | Schiffmann | G01S 13/589 |

\* cited by examiner

METHOD AND SYSTEM FOR DETERMINING THE POINTING ANGLE OF A MOVING OBJECT

BACKGROUND

Modern day vehicles include a variety of sensors and detectors that provide information regarding the environment or vicinity around a vehicle. For example, radar tracking devices provide information regarding objects in a vicinity or pathway of a vehicle. Such information is useful for driver assistance features. In some cases, automated or semi-automated vehicle operation is possible based on such information. For example, adaptive cruise control and parking assist features are known that automatically control speed or movement of a vehicle based on such sensor input. Autonomous or automated vehicles that are self-driving may utilize such information.

While radar and other sensor devices have proven useful, there are limitations on the type or accuracy of information available from them. For example, known radar tracking devices do not provide information regarding the orientation or pointing angle of an object. Instead, existing radar tracking devices typically operate based on an assumption that the orientation or pointing angle is equal to or aligned with the velocity vector of the centroid of the object. A more accurate indication of the orientation or pointing angle of a moving object would provide better information useful, for example, in determining the potential for a collision with the object.

SUMMARY

An illustrative example method of tracking a moving object includes determining a heading angle of a centroid of the object from a tracking sensor, determining a raw difference value corresponding to a difference between a pointing angle of a selected feature on the object and the heading angle, wherein the raw difference is based on a trajectory curvature of the centroid from the tracking sensor and a distance between the centroid and the selected feature, determining a filtered difference between the pointing angle and the heading angle using a low pass filter, and determining the pointing angle by subtracting the filtered difference from the heading angle.

In an example embodiment having one or more features of the method of the previous paragraph, determining the raw difference comprises determining a product of the curvature and the distance.

In an example embodiment having one or more features of the method of any of the previous paragraphs, determining the filtered difference comprises determining a plurality of the raw difference values and filtering the plurality of raw difference values to remove noise from the raw difference values.

In an example embodiment having one or more features of the method of any of the previous paragraphs, the low pass filter is time-based.

In an example embodiment having one or more features of the method of any of the previous paragraphs, the low pass filter is distance-based.

In an example embodiment having one or more features of the method of any of the previous paragraphs, the object is a vehicle having a front wheel axle and a rear wheel axle; the selected feature is a center of the rear wheel axle; and the center of the rear wheel axle is assumed to be located at a center of a rear of the object.

In an example embodiment having one or more features of the method of any of the previous paragraphs, a sideslip angle of the center of the rear wheel axle is assumed to be zero.

In an example embodiment having one or more features of the method of any of the previous paragraphs, the trajectory curvature is constant over the entire vehicle.

An illustrative example system for tracking a moving object includes a tracking sensor configured to detect the moving object and a processor that is configured to: determine a heading angle of a centroid of the object based on information from the tracking sensor; determine a raw difference value corresponding to a difference between a pointing angle of a selected feature on the object and the heading angle, wherein the raw difference is based on a trajectory curvature of the centroid and a distance between the centroid and the selected feature, and the trajectory curvature is based on information from the tracking sensor; determine a filtered difference between the pointing angle and the heading angle using a low pass filter; and determine the pointing angle by subtracting the filtered difference from the heading angle.

In an example embodiment having one or more features of the system of the previous paragraph, the processor is configured to determine the raw difference by determining a product of the curvature and the distance.

In an example embodiment having one or more features of the system of any of the previous paragraphs, the processor is configured to determine the filtered difference by determining a plurality of the raw difference values and filtering the plurality of raw difference values to remove noise from the raw difference values.

In an example embodiment having one or more features of the system of any of the previous paragraphs, the low pass filter is time-based.

In an example embodiment having one or more features of the system of any of the previous paragraphs, the low pass filter is distance-based.

In an example embodiment having one or more features of the system of any of the previous paragraphs, the object is a vehicle having a front wheel axle and a rear wheel axle, the selected feature is a center of the rear wheel axle, and the center of the rear wheel axle is assumed to be located at a center of a rear of the object.

In an example embodiment having one or more features of the system of any of the previous paragraphs, a sideslip angle of the center of the rear wheel axle is assumed to be zero.

In an example embodiment having one or more features of the system of any of the previous paragraphs, the trajectory curvature is constant over the entire vehicle.

The various features and advantages of at least one disclosed example embodiment will become apparent to those skilled in the art from the following detailed description. The drawings that accompany the detailed description can be briefly described as follows.

DETAILED DESCRIPTION

Figure 1:
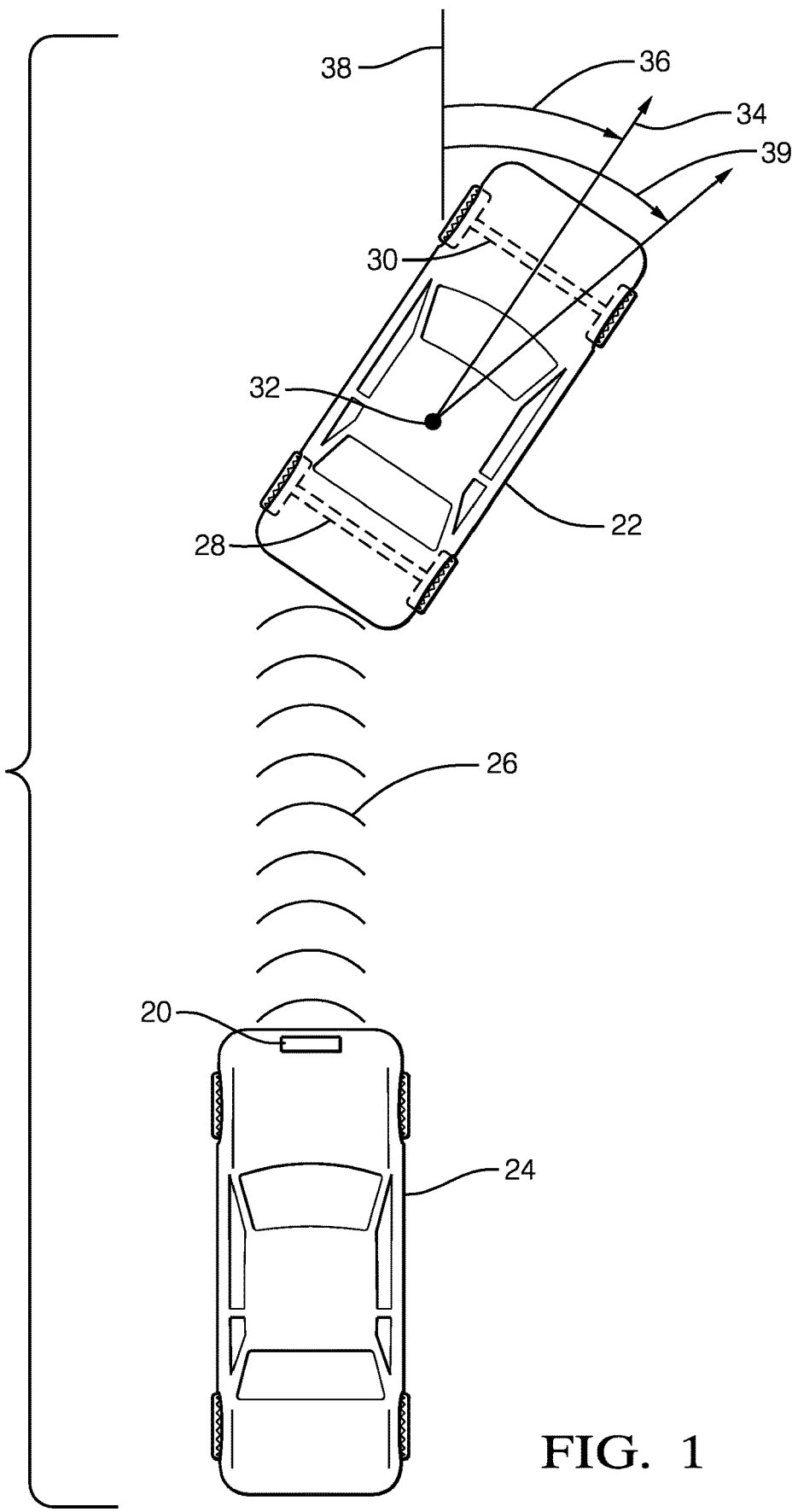
FIG. 1 diagrammatically illustrates an example use of a system for tracking a moving object designed according to an embodiment of this invention.

FIG. 1 diagrammatically illustrates a system 20 for tracking a moving object 22. In this example, the system 20 comprises a tracking device situated on a vehicle 24. For discussion purposes, the moving object 22 is another vehicle located ahead of the vehicle 24 and at least partially in a pathway of the vehicle 24. The system 20 uses radar signaling as schematically shown at 26 for detecting several characteristics of the vehicle 22.

While the moving object or vehicle 22 includes various features, a few are of interest for purposes of understanding an example embodiment of this invention. The vehicle 22 includes a rear wheel axle 28 and a front wheel axle 30. As schematically shown in FIG. 1, the vehicle 22 includes a centroid 32.

The vehicle 22 is traveling along a curved trajectory, such as turning (to the right according to the drawing). Under such conditions, the longitudinal axis 34 is oriented at a pointing angle 36 relative to a reference 38. A velocity vector of the centroid 32 of the vehicle 22 is situated at a heading angle 39 under the conditions shown in FIG. 1. The coordinate system in which the pointing angle 36 is determined may be based upon a world coordinate system in which the reference 38 is one of the axes of that coordinate system. Alternatively, the coordinate system may be fixed relative to the vehicle 24 or the system 20.

In this document, the pointing angle refers to the body orientation angle of a moving object, such as the vehicle 22, that is being tracked by the system 20. The body orientation angle or the pointing angle is the azimuth direction that the moving body's centerline or longitudinal axis is pointing.

In this document, the heading angle is the direction of motion of a particular reference point on the moving object, such as the vehicle 22. It is worth noting that in some contexts, such as aviation, the term "heading angle" is used to refer to that which is called the "pointing angle" in this document. Also, in aviation contexts, the term "track" is used to refer to that which is called the "heading angle" in this document.

Figure 2:
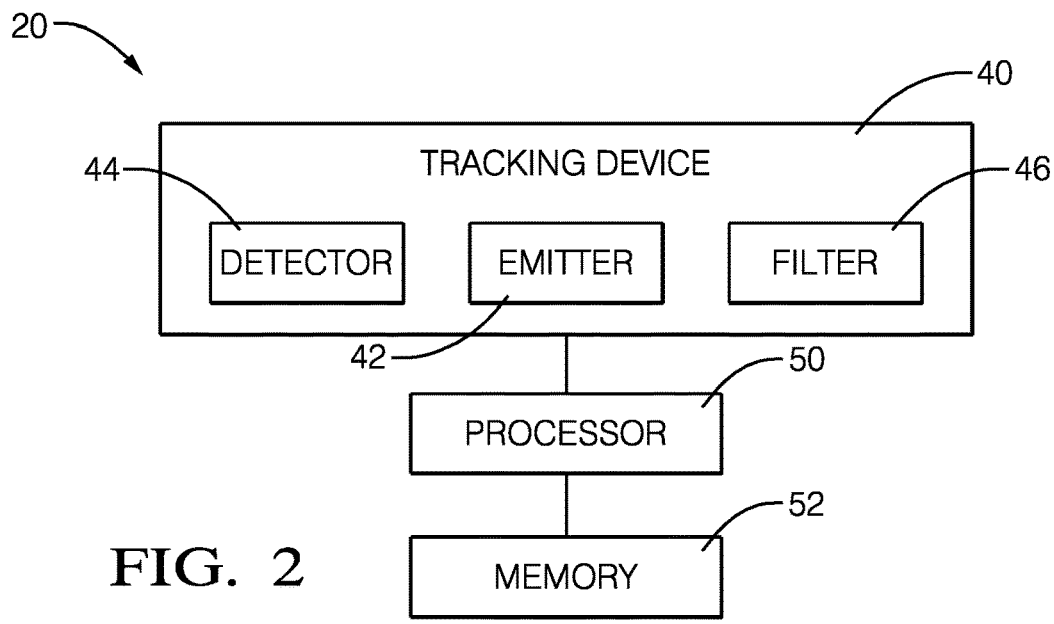
FIG. 2 schematically illustrates selected portions of an example embodiment of a system for tracking an object designed according to an embodiment of this invention.

FIG. 2 schematically illustrates selected portions of the system 20. A tracking device 40 includes an emitter 42 and detector 44. The emitter 42 emits radiation in an outward direction and, when such radiation reflects off of an object, that reflected radiation is received and detected by the detector 44. In some example embodiments, the emitter 42 and detector 44 operate according to known radar principles and techniques. Other embodiments include emitter and detector configurations that are useful for lidar or ultrasonic detection techniques.

The tracking device 40 includes a filter 46 that is configured for estimating dynamic quantities of a tracked object such as the position, velocity, acceleration, and trajectory curvature of that object. In some example embodiments, the filter 46 operates according to known principles of Kalman filters. The filter 46 in this example provides information that indicates the heading angle of a reference point on the moving object. For example, the filter 46 provides information indicating the heading angle 36 of the centroid 32 of the vehicle 22.

The system 20 includes a processor 50, which may be a dedicated microprocessor or a portion of another computing device supported on the vehicle 24. Memory 52 is associated with the processor 50. In some example embodiments, the memory 52 includes computer-executable instructions that cause the processor 50 to operate for purposes of tracking a moving object and determining the pointing angle or body orientation angle of that object. In some example embodiments, the memory 52 at least temporarily contains information regarding various features or characteristics of a tracked object to facilitate the processor 50 making desired determinations regarding the pointing angle of such an object.

The filter 46 is capable of providing information regarding the heading angle of the centroid of a moving object, however, the filter 46 is not capable of directly measuring the pointing angle of a moving object. In this embodiment, the processor 50 is configured for determining the pointing angle based on information from the tracking device 40 regarding the heading angle of a reference point on the object and a vehicle dynamics model. Example embodiments of this invention allow for more accurately determining the pointing angle of a moving object, such as the vehicle 22, which improves object tracking systems and improves the ability to assist a driver or to automate vehicle control based on an improved estimation of the orientation or pointing angle of a tracked object. Embodiments of this invention, therefore, provide an improvement in tracking technology and improvements in vehicle control based on information regarding moving objects in a vicinity or pathway of a vehicle. Having more accurate information regarding a pointing angle of a moving object provides, for example, improved ability to maintain a desired distance or clearance from a moving object.

Figure 3:
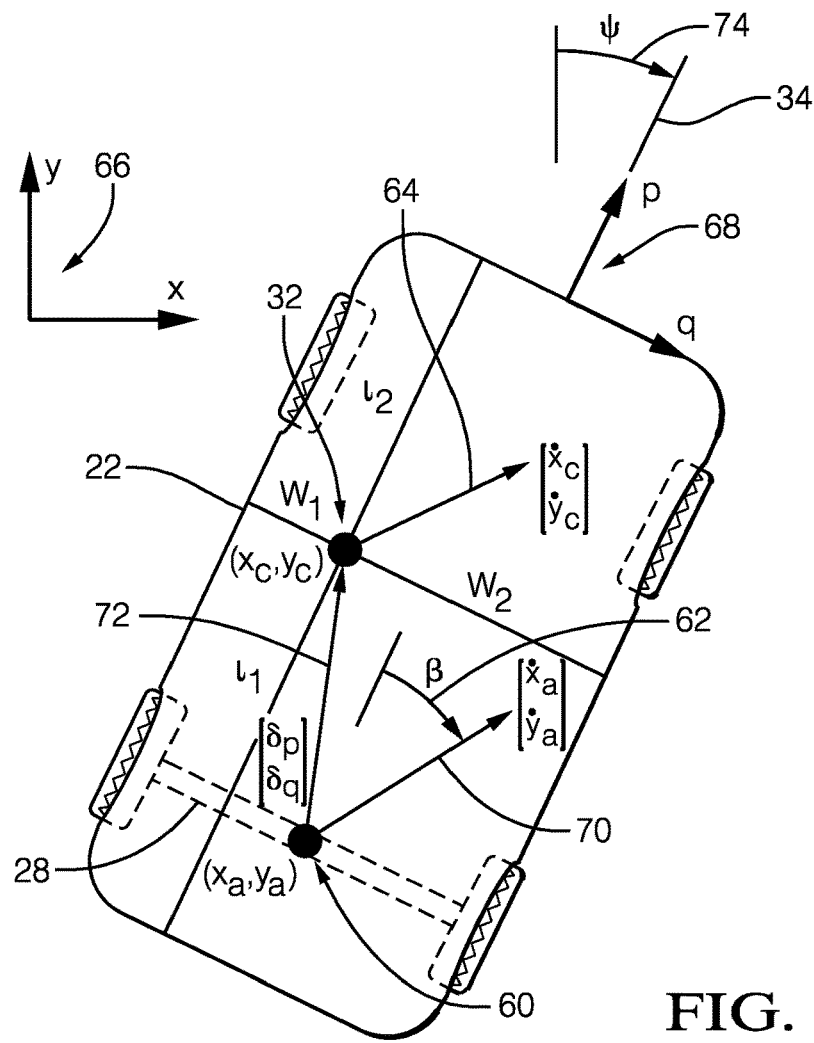
FIG. 3 schematically illustrates various characteristics of a moving object.

FIG. 3 schematically illustrates several features and characteristics of the vehicle 22, which is an example moving object tracked by the system 20. In this example, a vehicle dynamics model can be considered a subset of the known bicycle model, which can be used as a reasonably accurate model of a passenger vehicle operating in a typical manner that includes relatively low lateral acceleration as occurs during most normal passenger vehicle driving. The example vehicle dynamics model includes simplifications, such as neglecting lateral load transfer and suspension compliances. Given that the example vehicle 22 is a four wheeled vehicle assumptions regarding the wheels of the vehicle are made to fit the bicycle model.

A selected feature of the vehicle 22 in this example is the center 60 of the rear wheel axle 28. The illustrated example utilizes the linear relationship between the lateral acceleration of the vehicle 22 and the sideslip angle at the rear axle center 60. The sideslip angle is the angle between the velocity vector at the rear axle center 60 and the vehicle longitudinal axis 34. In FIG. 3, the sideslip angle $\beta$ is shown at 62. If the velocity vector of the rear axle center 60 is the same as the direction of the rear wheels, then the sideslip angle is 0°. When the vehicle 22 is turning, the velocity vector of the rear axle center 60 is typically not the same as the direction that the rear wheels are pointing. The constant of proportionality between the lateral acceleration and the sideslip angle is called the rear cornering compliance. The rear wheels or tires of the vehicle 22 have a lateral velocity component to generate the lateral forces and consequent yaw moment required to support the lateral acceleration that the vehicle 22 is experiencing, which is expressed by the rear cornering compliance. In a steady-state turn condition that includes a constant yaw rate and constant speed, the yaw moment created by forces at the rear wheels is cancelled by a similar moment generated at the front wheels resulting in a constant yaw rate. In an example embodiment, empirical data is used for determining the value of rear cornering compliance based on measurements of a number of actual vehicles. The kinematics model of the disclosed example embodiment utilizes a linear relationship between the sideslip angle of the rear axle center 60 and lateral acceleration at the rear axle center 60.

In the illustrated example, the tracking filter 46 provides an indication of the velocity vector 64 of the centroid 32 of the vehicle 22. The velocity vector 64 is expressed in terms of an X-Y coordinate system represented at 66. The X-Y coordinate system may be in terms of world coordinates or may be in terms of a coordinate system of the vehicle 24, depending on the particular embodiment. In some cases, the world coordinate system and the coordinate system of the vehicle 24 are the same while in others there is a known relationship between those coordinate systems. Body position coordinates p, q of the vehicle 22 are represented in FIG. 3 at 68.

The tracking device 40 is also capable of providing information regarding a positon of the centroid 32 on the body of the vehicle 22. In FIG. 3, the dimensions $l_1$, $l_2$, $w_1$, and $w_2$ indicate the position of the centroid 32 relative to the edges of the body of the vehicle 22. There are known tracking techniques for determining a bounding box corresponding to the edges of the vehicle 22 and for locating the centroid 32 within that bounding box. In this example, the filter 46 uses a Nearly Coordinated Turn Constant Acceleration Motion Model to provide an estimate of a position of the centroid 32 in the world, an over-the-ground speed of the centroid 32, the heading angle of the centroid 32, which is the same as the direction of the velocity vector 64 shown in FIG. 3. The filter 46 also provides information regarding a trajectory curvature of the centroid 32 and tangential acceleration of the centroid 32.

The speed and curvature of the centroid 32 together imply a yaw rate. In this example embodiment, at a given instant the yaw rate is considered to be the same for any two points on the rigid body of the vehicle 22.

The position of the centroid 32 may be determined in advance or located within the bounding box of the vehicle 22 by processing the positions of radar detections of the vehicle relative to the centroid position over time. In either case, determining the pointing angle of the vehicle 22 effectively amounts to determining how the bounding box of the vehicle 22 should be rotated about the centroid 32 in a way that simultaneously satisfies the vehicle dynamics constraint at the rear axle center 60 and the kinematic relationship between the velocity vectors 64 (at the centroid 32) and 70 (at the rear axle center 60).

In the illustrated example, a longitudinal position of the rear axle 28 is assumed relative to the body of the vehicle 22. In some examples, the assumed longitudinal position is approximately one meter ahead of the rear of the vehicle 22. In some examples, the rear axle center 60 is assumed to be at the rear of the vehicle 22. Given the assumed longitudinal position of the rear axle center 60 and the location of the centroid 32, the processor 50 determines a vector 72 from the rear axle center 60 to the centroid 32.

Figure 4:
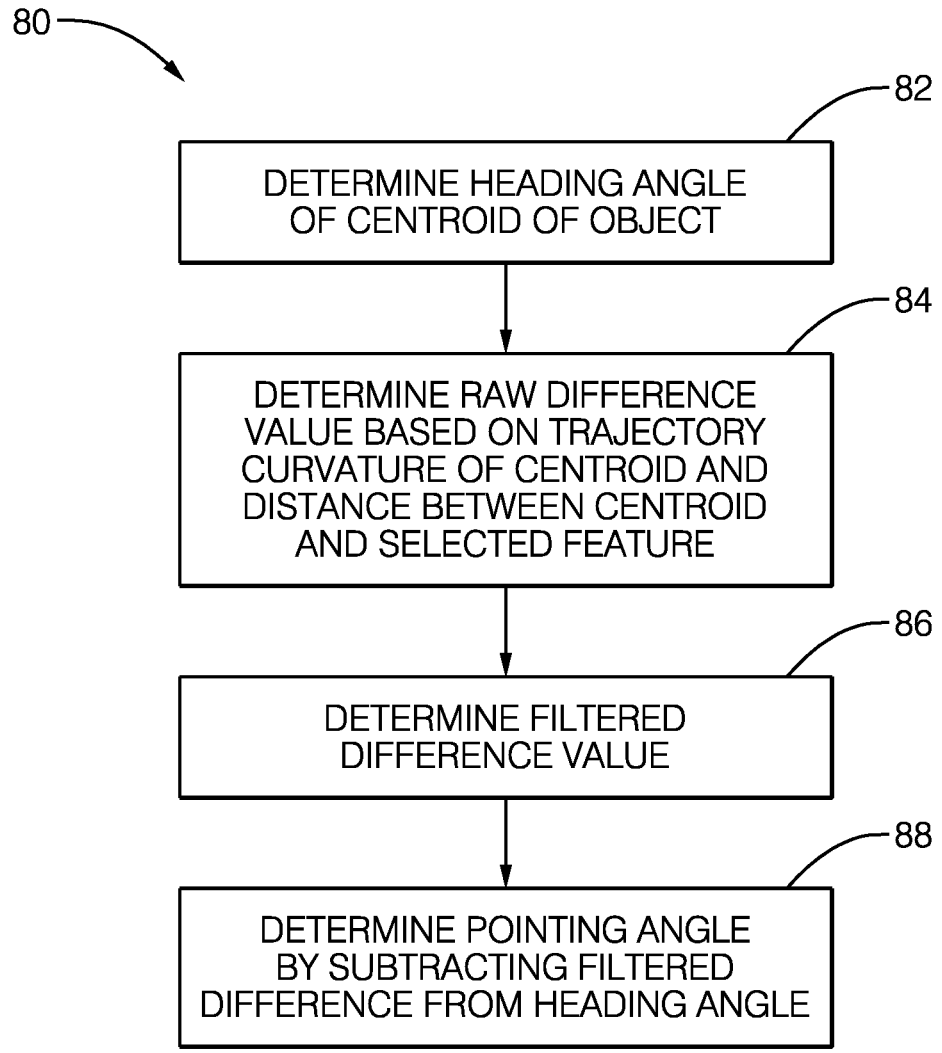
FIG. 4 is a flowchart diagram summarizing an example approach of determining a pointing angle of a moving object while tracking that object.

FIG. 4 includes a flowchart diagram 80 that summarizes an example approach that the processor 50 uses for determining the pointing angle of the vehicle 22 represented by Ψ at 74 in FIG. 3. This approach includes several assumptions. The rear axle center 60 is assumed to be located at the lateral center of the rear face of the vehicle 22. The sideslip angle at the rear axle center 60 is assumed to be zero. This assumption is reasonable under many driving conditions because the actual sideslip angle may approach 0.5°. The trajectory curvature is assumed to be approximately constant over the entire vehicle 22.

As indicated at 82 in FIG. 4, the processor 50 determines the heading angle of the centroid 32, which corresponds to the direction of the velocity vector 64. Information regarding the velocity vector 64 and the heading angle are provided to the processor 50 by the filter 46.

At 84, the processor 50 determines a raw difference value between the pointing angle of interest and the heading angle of the centroid 32 based on the trajectory curvature of the centroid 32 and the distance between the centroid 32 and the selected feature of the moving object, which in this example is the rear axle center 60 of the vehicle 22. The processor 50 uses the following relationship:

$$\Delta_{raw} = \kappa l_1$$

wherein k is the trajectory curvature at the centroid 32 as obtained from the filter 46 and $l_1$ represents the distance between the centroid 32 and the rear axle center 60.

At 86, the processor 50 determines a filtered value by low pass filtering a sequence of determined raw difference values. The filtered difference may be considered to be the difference between the pointing angle 74 of the vehicle 22 and the heading angle of the centroid 32. The filtered difference may be represented as follows:

$$\Delta_{filt} = LPF(\Delta_{raw})$$

In some embodiments, the low pass filter is a time-based filter, which includes a time constant. In such embodiments, the raw difference determinations over time are filtered to arrive at the filtered difference value at 86. In other embodiments, the low pass filter is distance-based and includes a distance-constant. In such embodiments, the tracked object or vehicle 22 has to be moving and multiple heading angle and raw difference values resulting from tracking such movement are filtered to arrive at the filtered difference value.

At 88, the processor 50 determines the pointing angle 74 by subtracting the filtered difference value $\Delta_{filt}$ from the heading angle of the centroid using the following relationships:

$$\phi = a\tan 2(\dot{y}_c, \dot{x}_c)$$

$$\Psi = \phi - \Delta_{filt}$$

In this example, the heading angle φ is determined using an arc tangent 2 based on the components of the centroid velocity vector 64. In an example embodiment, the arguments or centroid velocity vector components are treated separately to provide four quadrants of information from the arc tangent 2 function instead of just two quadrants. The processor 50 is programmed or otherwise configured to identify the appropriate results from those four quadrants for determining the heading angle of the centroid 32.

The disclosed example embodiment approach for determining the pointing angle of a moving object, such as the vehicle 22, improves object tracking and automated or semi-automated vehicle control in an efficient manner that does not require using the quadratic formula and multiple solutions, which would be computationally complex. Example embodiments of this invention provide reasonably accurate information regarding a body orientation angle or pointing angle of a moving object that is more accurate than previous approaches, which at best assumed the pointing angle to be the same as the heading angle of a centroid of such an object.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of tracking a moving object, the method comprising:
   determining a heading angle of a centroid of the object from a tracking sensor;
   determining a raw difference value corresponding to a difference between a pointing angle of a selected feature on the object and the heading angle, wherein the raw difference is based on a trajectory curvature of the centroid from the tracking sensor and a distance between the centroid and the selected feature;
   determining a filtered difference between the pointing angle and the heading angle using a low pass filter; and
   determining the pointing angle by subtracting the filtered difference from the heading angle.

2. The method of claim 1, wherein determining the raw difference comprises determining a product of the curvature and the distance.

3. The method of claim 1, wherein determining the filtered difference comprises
   determining a plurality of the raw difference values; and
   filtering the plurality of raw difference values to remove noise from the raw difference values.

4. The method of claim 3, wherein the low pass filter is time-based.

5. The method of claim 3, wherein the low pass filter is distance-based.

6. The method of claim 1, wherein
   the object is a vehicle having a front wheel axle and a rear wheel axle;
   the selected feature is a center of the rear wheel axle; and
   the center of the rear wheel axle is assumed to be located at a center of a rear of the object.

7. The method of claim 6, wherein
   a sideslip angle of the center of the rear wheel axle is assumed to be zero.

8. The method of claim 7, wherein the trajectory curvature is constant over the entire vehicle.

9. A system for tracking a moving object, the system comprising:
   a tracking sensor configured to detect the moving object; and
   a processor configured to:
   determine a heading angle of a centroid of the object based on information from the tracking sensor;
   determine a raw difference value corresponding to a difference between a pointing angle of a selected feature on the object and the heading angle, wherein
      the raw difference is based on a trajectory curvature of the centroid and a distance between the centroid and the selected feature, and
      the trajectory curvature is based on information from the tracking sensor;
   determine a filtered difference between the pointing angle and the heading angle using a low pass filter; and
   determine the pointing angle by subtracting the filtered difference from the heading angle.

10. The system of claim 9, wherein the processor is configured to determine the raw difference by determining a product of the curvature and the distance.

11. The system of claim 9, wherein the processor is configured to determine the filtered difference by
    determining a plurality of the raw difference values; and
    filtering the plurality of raw difference values to remove noise from the raw difference values.

12. The system of claim 11, wherein the low pass filter is time-based.

13. The system of claim 11, wherein the low pass filter is distance-based.

14. The system of claim 9, wherein
    the object is a vehicle having a front wheel axle and a rear wheel axle;
    the selected feature is a center of the rear wheel axle; and
    the center of the rear wheel axle is assumed to be located at a center of a rear of the object.

15. The system of claim 14, wherein
    a sideslip angle of the center of the rear wheel axle is assumed to be zero.

16. The system of claim 15, wherein the trajectory curvature is constant over the entire vehicle.

* * * * *